Aug. 11, 1964  W. D. LEWIS ETAL  3,144,264
BAND TYPE COUPLING FOR FLANGED PIPE
Filed May 10, 1961  2 Sheets-Sheet 2
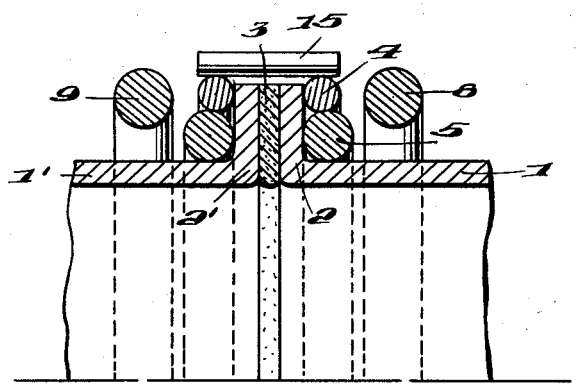
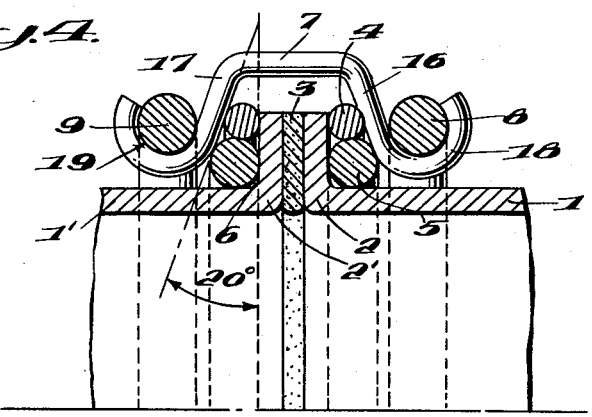
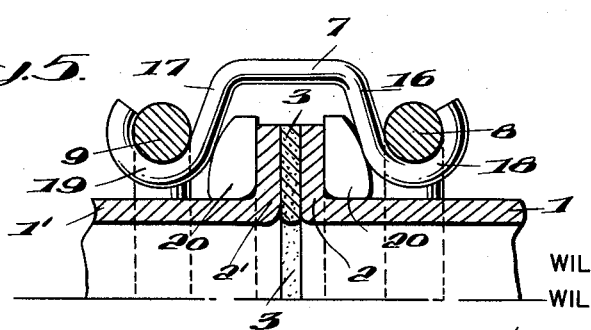
INVENTORS
WILLIAM D. LEWIS
WILLIAM D. WEBB
BY Harry J. McCauley
ATTORNEY United States Patent Office 3,144,264
Patented Aug. 11, 1964

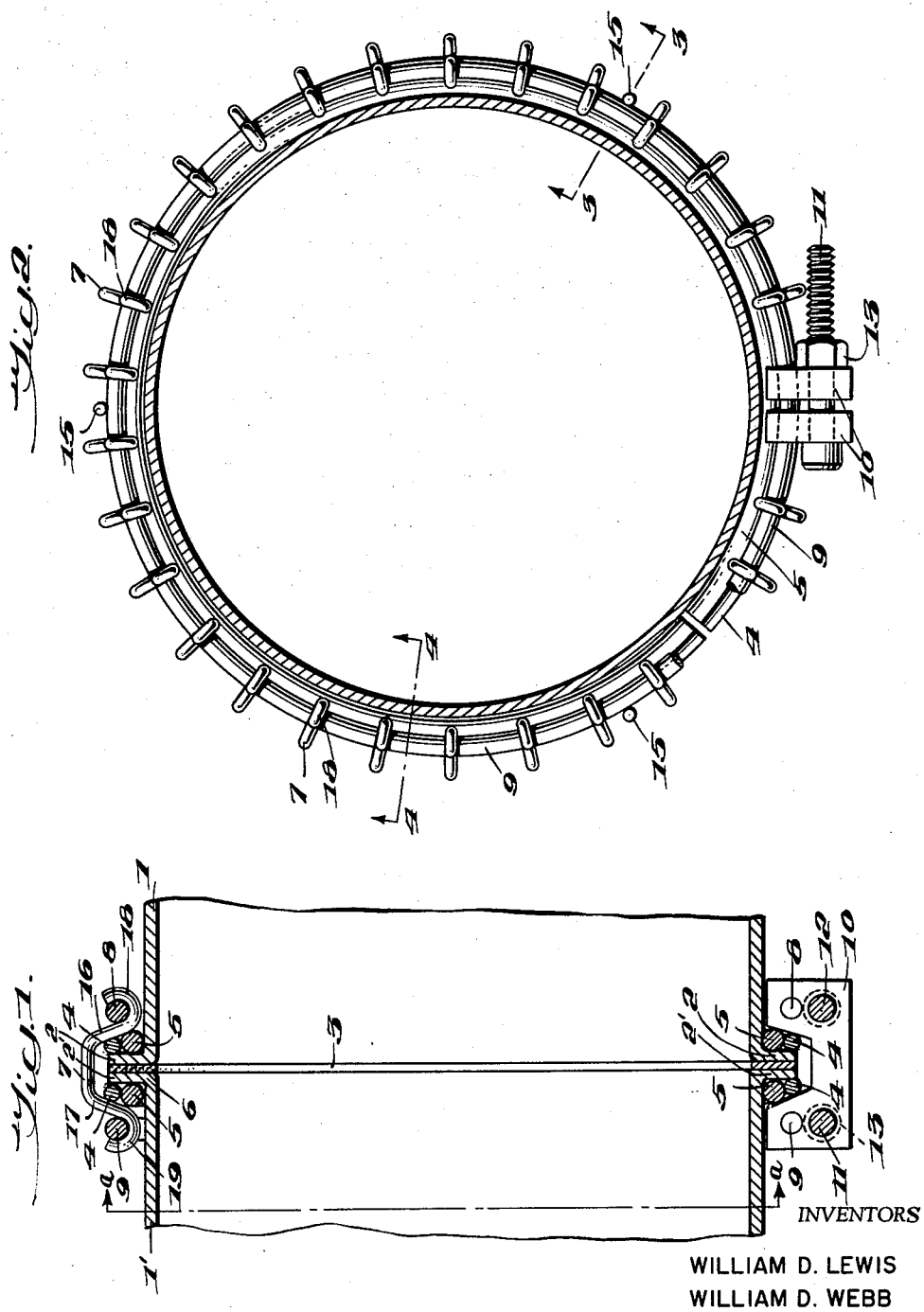

3,144,264
BAND TYPE COUPLING FOR FLANGED PIPE
William D. Lewis, Wilmington, and William D. Webb, Hockessin, Del., assignors to E. I. du Pont de Nemours and Company, Wilmington, Del., a corporation of Delaware
Filed May 10, 1961, Ser. No. 109,223
2 Claims. (Cl. 285—367)

This invention relates to couplings for pipes or tubular members, and more particularly to a coupling for flanged conduits.

There have been previous attempts to make pipe couplings to insure better seals of the joint by use of an inclined plane. However, none of the designs evolved have been satisfactory from the standpoint of fluid tightness. In our present invention an improvement is obtained in that force application is initiated perpendicular to the axis, but then converted through inclined plane action to an axial force applied to the pipe flanges. Thus, the invention is characterized by the fact that it applies a greater share of the total force at the gasket inner diameter opposite the fillets of the flanges. This feature of applying maximum force at the gasket inner diameter is an improvement over the art, in that it makes for a leak-tight joint and, at the same time, minimizes bending of the flanges under load conditions.

The invention has as an object an improved pipe coupling to insure a more uniform seal at the joint and to provide strength to prevent leakage due to high pressures and misalignment. A further object is an improved design minimizing the bending of the flange under load conditions. A still further object is a unique design applying maximum gasket load at the inner periphery of the gasket.

Another object of this invention is the provision of a coupling device exerting substantially uniform axial force against co-operating flanges.

A still further object of the invention is the provision of a coupling facilitating the easy alignment of the conduits to be connected.

The invention also consists in certain other features of construction and in the combination and arrangement of the several parts, as hereinafter fully described and specifically pointed out in the appended claims.

These objects are accomplished according to this invention by the provision of a coupling joining the ends of two tubular flanged members separated by a gasket which comprises in combination means for applying a radially inward force to the tubular members, means for uniformly converting this radial force into an axial force applied against the gasket, and means for aligning the flanges of said tubular members and said gasket during assembly.

Fundamentally, the theory of the invention is that a hoop tension is converted into a radial force, and subsequently into an axial force at the inside diameter of the gasket in the vicinity of the fillet of the flange by utilizing the principle of the inclined plane.

In the following description, reference will be made to the accompanying drawings in which:

FIG. 1 shows a longitudinal section of a preferred embodiment of the pipe joint according to this invention, FIG. 2 shows a cross-section of the pipe joint on line a—a, FIG. 1, with a short section of the hoop wire cut away to show the relative disposition of the terminal ends of the back-up rings.

FIG. 3 is a section taken on line 3—3, FIG. 2,

FIG. 4 is a section taken on line 4—4, FIG. 2, showing to somewhat enlarged scale the same coupling design as FIG. 1, and FIG. 5 is a sectional view similar to that of FIG. 4 showing another embodiment of pipe joint according to this invention.

In FIG. 1, the pipes 1, 1' to be connected together are abutted at their flanges 2, 2' with an annular gasket 3 interposed therebetween. Behind each flange is placed a split "back-up" ring composed of two wires, a radially outer back-up ring 4 and a radially inner back-up ring 5. The outer back-up ring 4 of smaller diameter wire is superimposed on top of the larger diameter wire inner back-up ring 5 with the splits in each aligned, and the rings are spot welded together to form a single integral structure. The outer back-up ring 4 when in position bears against the flange near its largest diameter (i.e., in the region of the outer common circumference of the flanges and gasket) whereas the inner back-up ring 5 bears against the flange at its smallest diameter, (i.e., in the region of the inner common circumference of the flanges and gasket) more specifically, at the fillet 6 of the flange. The difference in diameters of the back-up rings is chosen specifically to define by tangent thereto an acute included angle encompassing the associated wires measuring about 20° from the perpendicular to the pipe axis, i.e., radius of the pipe, as shown particularly in FIG. 4.

The coupling proper is composed of a plurality of shaped wire bales 7 defining inwardly disposed channel sections spaced at equal intervals around the flange. The arms 16 and 17 of these bales are bent to conform to the included angle of 20° or slightly less from the perpendicular hereinbefore described for back-up rings 4 and 5. Thus, the inside surfaces of the arms of wire bales 7 are adapted to bear securely against the back-up rings. The ends of the arms 16 and 17 are bent upwards into hooks 18 and 19.

Spot-welded in the hook-shaped parts of all of the bales 7 around the flanges are split circular wire hoops 8 and 9, the complete assembly constituting a clamp. These hoops completely encircle the pipe and terminate at the free ends in metal saddles 10. The ends of the hoop wires are swaged in the saddles to securely anchor them. Two draw bolts 11 and 12 inserted through holes in the saddles are tightened by nuts such as 13, FIG. 2.

As shown in FIGS. 2 and 3, there are provided a minimum of three guide pins 15 spot welded equiangularly around the outside diameter of one outer back-up ring 4 used and projecting in the direction of the flange of the connecting pipe.

In assembling the coupling, the composite back-up ring assemblies 4–5 are spread apart slightly at the split and slid over the flanges 2 and 2', to fit tightly back of the flanges with the side having the wires 4 and 5 in the same general radial plane disposed in abutment with the flanges. The back-up ring assemblies on each pipe are rotated so that their split ends lie on approximately the same line parallel to the pipe axis in the connection to be made.

Next, the clamp made up of the bales 7 secured to the split hoops 8 and 9 is slipped over one of the flanges to a position where the bale arms 16 (or 17) bear on the back-up rings 4 and 5 on the side remote from the flange 2 (or 2'). The gasket 3 can now be conveniently placed in position against the flange of the pipe provided with the back-up ring having the guide pins 15, which cradle the gasket therebetween and hold it in place until the pipe flanges can be brought into abutment. The remaining side of the clamp having bales 7 and hoops 8 and 9 can then be brought into position over the second of the pair of ring assemblies 4–5 and the clamp rotated circumferentially of the pipe ends so that the metal saddles 10 lie 5–20° out of axial line with the splits in the back-up ring assemblies and, of course, with bales 7 out of line with pins 15. When nuts 13 are tightened on their bolts 11 and 12, the coupling is completed by circumferential draw-up of the clamp.

Further tightening of the nuts 13 on the draw bolts 11 and 12 draws the saddles 10 closer together. This reduces the circumference of the wire hoops 8 and 9 and creates a hoop tension which is transferred to the bales 7. This force in the wire bales sets up a resultant force at an angle of about 45° directed against the flange juncture with the pipe. The arms of the channel-shaped wire bales having an included angle of 20° or less with the flanges transfer this radially inward force at the point of common surface with the outer 4 and inner 5 back-up rings. This force is exerted against the back-up rings which function as inclined planes to convert the radial inward force of the clamp assembly into axial forces exerted against the gasket through the flanges. The effect of the outer back-up ring 4, which is fabricated from smaller diameter wire than inner back-up ring 5, is not only to provide an inclined plane action but also to insure that more load will be directed against the larger diameter back-up ring 5. By applying more load to the back-up ring 5 the coupling applies maximum axial force to the gasket in the region of the fillet 6 of the flange and minimizes the bending of the flange under load.

Another embodiment of the invention is shown in FIG. 5. This embodiment differs from the embodiment of the invention hereinbefore described only in that a single wire ring 20 of generally triangular cross-section is substituted for the combined wire rings 4 and 5 of FIG. 1. The triangular cross-section wire ring 20 functions as an inclined plane in the same manner as wire rings 4 and 5 of the first embodiment.

This invention can be used in any application where two tubular flanged members are to be joined, but it has particular use for joints where added strength is required to prevent leakage because of relatively great pressure or bending loads on the pipe flange.

As many widely different embodiments of this invention may be made without departing from the spirit and scope thereof, it will be understood that this invention is not limited to the specific embodiments thereof except as defined in the appended claims.

What is claimed is:

1. A pipe coupling assembly comprising in combination two pipes provided with opposed flanges in abutment with a gasket interposed therebetween, each flange having positioned thereagainst on the side opposite said gasket, a split metal ring made up of lengths of a first and a second wire formed circularly to extend around the entire circumference of each of said pipes adjacent said flanges, said first wire being of smaller diameter than said second wire and formed to a larger circumference than said second wire, said second wire being adapted to abut adjacent the fillet joinder between said flanges and the cylindrical runs of said pipes, and said first wire and said second wire being joined one to another so as to present extreme boundaries disposed against said flanges in substantially a common plane radial of said pipes while presenting on the side opposite said flanges a common tangent inclined outward radially of said pipes toward said flanges, a clamp adapted to encircle said flanges having interior surfaces conforming approximately to each said common tangent, and means to draw said clamp tight circumferentially in abutment with said first wire and said second wire of each of said metal ring at points lying on said common tangent.

2. A pipe coupling assembly according to claim 1 wherein said first wire is provided with guide means disposed generally parallel to the axes of said pipes at a radial distance from said axes of said pipes clearing, but in close proximity to, said flanges.

References Cited in the file of this patent
UNITED STATES PATENTS

| | | |
|---|---|---|
| 1,937,881 | Fisher | Dec. 5, 1933 |
| 2,519,847 | Neely | Aug. 22, 1950 |

FOREIGN PATENTS

| | | |
|---|---|---|
| 645,613 | France | June 27, 1928 |
| 969,488 | France | May 24, 1950 |
| 820,328 | Great Britain | Sept. 16, 1959 |